United States Patent [19]
Gray

[11] Patent Number: 4,558,077
[45] Date of Patent: Dec. 10, 1985

[54] EPOXY BONDED RARE EARTH-IRON MAGNETS

[75] Inventor: Richard K. Gray, Warren, Mich.

[73] Assignee: General Motors Corporation, Detroit, Mich.

[21] Appl. No.: 587,508

[22] Filed: Mar. 8, 1984

[51] Int. Cl.[4] .................................................. C08K 3/22

[52] U.S. Cl. .................................. 523/458; 148/31.57; 148/103; 523/457

[58] Field of Search ................ 523/458, 457; 525/523, 525/529; 528/117; 148/31.57, 103

[56] References Cited

U.S. PATENT DOCUMENTS

| | | | |
|---|---|---|---|
| 3,438,937 | 4/1969 | Christie | 528/117 |
| 3,596,350 | 8/1971 | Steingroever | 148/103 |
| 3,634,323 | 1/1972 | Moran | 525/529 |
| 3,933,536 | 1/1976 | Doser et al. | 148/31.57 |
| 4,141,943 | 2/1979 | Houska | 148/31.57 |
| 4,335,228 | 6/1982 | Beitchman et al. | 528/117 |

*Primary Examiner*—Lewis T. Jacobs
*Attorney, Agent, or Firm*—Elizabeth F. Harasek

[57] ABSTRACT

Novel epoxy compositions and a method of using them to make bonded rare earth-iron alloy magnets have been developed. The epoxy resins are polyglycidyl ethers of polyphenol alkanes that have high glass transition temperatures. The epoxy resin is provided in the form of a powder containing a suitable amount of a latent imidazole curing agent. The powder is mixed with rare earth-iron alloy particles, the mixture is compacted, and the resultant compact is heated to melt the powder and activate the curing agent. The alloy particles in the resultant magnet body are exceptionally resistant to flux loss upon aging.

14 Claims, 3 Drawing Figures

EPOXY BONDED RARE EARTH-IRON MAGNETS

This invention relates to compacted rare earth-iron-boron particle magnets that are bonded with a novel, dry epoxy powder containing a latent catalyst. The catalyst is first activated after compaction to create a durable, flux-loss resistant permanent magnet.

BACKGROUND

Recently, a novel family of alloys with exceptional permanent magnetic strength were invented. These alloys are based on light rare earth elements (RE), preferably neodymium and praseodymium; the transition metal element, iron; and boron. The primary phase of the magnetic alloys is believed to have the composition $RE_2Fe_{14}B$, while the preferred composition of the starting alloy is in the range of about $RE_{0.12-015}B_{0.04-0.09}Fe_{bal}$ (atomic fractions). These alloys are also known under the General Motors tradename "MAGNEQUENCH".

A preferred method of processing such alloys to make magnets is melt-spinning. Melt-spinning entails casting a stream of molten alloy onto the perimeter of a rotating chill disk to very rapidly quench the alloy into thin ribbon. The rate of solidification is controlled by regulating the wheel speed to create magnetic domain or smaller sized crystallites in the ribbons as quenched. Rapidly quenched alloy with subdomain sized crystallites may be heated to suitable temperatures to cause grain growth to optimum crystallite size.

Light rare earth-iron based magnetic alloy compositions and methods of processing them into permanent magnets are described in greater detail in U.S. Ser. Nos. 274,070; 414,936; 508,266; and 544,728 which are all to Croat, assigned to the assignee hereof and incorporated herein by reference. Neodymium and/or praseodymium-iron based magnetic alloys are particularly commercially significant because they exhibit magnetic energy products in the same class as samarium-cobalt permanent magnet alloys but at much lower cost.

In order to make bonded magnets from melt-spun alloy ribbon, it is necessary to break the friable ribbon into small pieces and then to compact the pieces under high pressure into desired magnet shapes.

U.S. Ser. No. 426,629 to Lee and Croat, which is assigned to the assignee hereof, relates to permanent magnets made from such alloy ribbon. A preferred method of making these magnets entails fracturing the friable alloy ribbons into particles small enough to fit in a compaction die, compacting the particles at a suitable pressure to achieve a magnetically isotropic, coherent compact with a density of at least about 75%, and then vacuum impregnating the voids of the compact with liquid epoxy. The epoxy is cured at an elevated temperature and any excess resin is machined away. While this "wet" process is suitable for laboratory use, it is not a preferred method for large scale production because it is not easy to handle catalyzed epoxy liquids and the impregnation process is relatively time consuming.

The concept of using organic and/or polymeric binders to make compacted particle magnets is not a new one. For example, it is a well known practice to mix a magnetizable alloy powder with a thermoplastic polymer that melts at low temperatures and then hot press or injection mold the mixture to make a magnet shape. Two injection mold the mixture to make a magnet shape. Two disadvantages of such processes are that the magnets produced are not suited for use at temperatures much above room temperature [i.e. at or above the glass transition temperature ($T_g$) of the polymer] and that a substantial amount of nonmagnetic polymer (30 volume percent or more) dilutes the magnetic constituent. I have also experimentally determined that a polymeric bonding agent is much less effective as an oxidation barrier for a magnetic alloy at temperatures above its glass transition temperature. It is also known that the strength and shape retaining properties of a polymer are substantially reduced at temperatures above its $T_g$.

Another known bonded magnet making practice entails dissolving a high melting polymeric constituent such as polycarbonate in a solvent; adding magnetic alloy powder to the solvent, and then adding a nonsolvent for the polymer to the mixture. The nonsolvent addition causes the alloy particles to precipitate out of solution, coated with the polymer. After the particles are dried, they can be hot pressed to coalesce the polymer coatings and form magnet shapes.

I believe that this method would be unsuited to working with rare earth-iron alloy powder because it would be very difficult to remove all the solvent from the precipitated polymer particles. Some solvent would be attracted to the alloy by ionic bonding, in a coprecipitation. Any solvent that remained would evaporate when the compact was finally heated thereby creating microscopic channels to the alloy surface. These channels would become vehicles for future oxidation of the rare earth-iron alloy and the accompanying degradation of its magnetic properties.

Attempts were made to precipitate thermosetting epoxy with a latent curing agent. This process resulted in a powder. When the dry-to-appearance precipitate powder mixed with alloy powder, compacted and then heated to cure the epoxy, the resin foamed in situ. The resultant product had poor strength and magnetic aging characteristics. The powder could not be dried at elevated temperature prior to compaction without prematurely activating the latent catalyst.

Because none of the conventional processes or chemical systems which were tried was found to be suitable for making polymer bonded rare earth-iron based magnets, a new approach was taken which resulted in the invention claimed in this patent.

BRIEF SUMMARY OF THE INVENTION

In accordance with a preferred practice of the invention, the bonding agent for a rare earth-iron based particle magnet comprises an epoxy resin which exhibits good bond strength and has a glass transition temperature above the expected use temperature, preferably greater than 150° C. The uncured epoxy is solid at room temperature. One such family of epoxies are polyglycidyl ethers of polyphenol alkanes. A preferred epoxy is a tetraglycidyl ether of tetraphenol ethane having the idealized chemical structure:

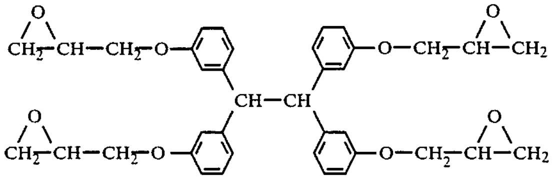

and an epoxide equivalent (grams of resin containing one gram-equivalent of epoxide) of about 150 to 300.

In order to cure the epoxy a suitable amount of an imidazole catalyst substituted in the two position with a short chain alkyl or hydroxyalkyl group is entrained in the epoxy resin. The preferred catalyst must be inactive up to about 100° C., but should cure rapidly at higher temperatures.

The preferred catalysts are 2-ethyl-4-methylimidazole (EMI) for optimum bond strength

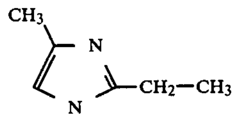

and 1-(2-hydroxy propyl)-2-methyl imidazole (HPMI) for optimum permeation resistance;

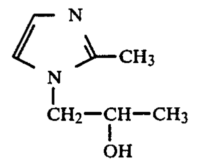

About 3–10 weight parts catalyst are used for each 100 weight parts epoxy resin.

A preferred method for making the bonding agent is to grind the dry epoxy to a fine powder. The powder is then charged into a high shear mixer. While the mixer is operating, the desired amount of liquid catalyst is added. Upon removal from the mixer, the powder is milled at a temperature below the activation temperature of the catalyst to a fine powder (1–15 micron diameter). The powder itself is dry and free flowing so it can be readily weighed and mixed with magnetic alloy particles.

In order to make a magnet shape, about 2 weight percent (about 15 volume percent) of the epoxy powder is thoroughly mixed with crushed melt-spun ribbon or particles of RE-Fe based alloy ingot ground to single domain sized particles. Care should be taken to keep the temperatures of the powders well below the activation temperature of the catalyst (about 120° C.) during milling and mixing.

The blended powders are loaded into a die cavity for compaction. At a pressure of about 160,000 psi, a part density of alloy ribbon and resin of about 85% is obtained. Melt-spun ribbons are magnetically anisotropic as formed so there is no advantage to applying a magnetic field while they are being pressed into magnet shapes. However, a magnetizing field may be applied during pressing to orient magnetically anisotropic single domain sized ground ingot particles.

After the blended powders are pressed, the resultant compact is heated to a temperature high enough to activate the imidazole curing agent and cure the epoxy resin. This may be done by heating in a conventional oven at about 150 degrees Centigrade for 30 minutes. The epoxy formulation is not itself a susceptor for induction heating, but the alloy particles are. Therefore, dry epoxy compacts can be cured in a short time (about two minutes) by induction heating.

Magnets made using the imidazole-cured epoxy powder are exceptionally strong and resistant to chemical degradation over long periods of time, even at elevated temperatures up to about 150 degrees C. The magnets can be provided with even greater resistance to magnetic degradation by plating them with a thin layer of copper, nickel, or some other metal.

DETAILED DESCRIPTION

These and other advantages of the subject invention will be better understood in view of the figures and description of preferred embodiments which follow.

Figure 1:
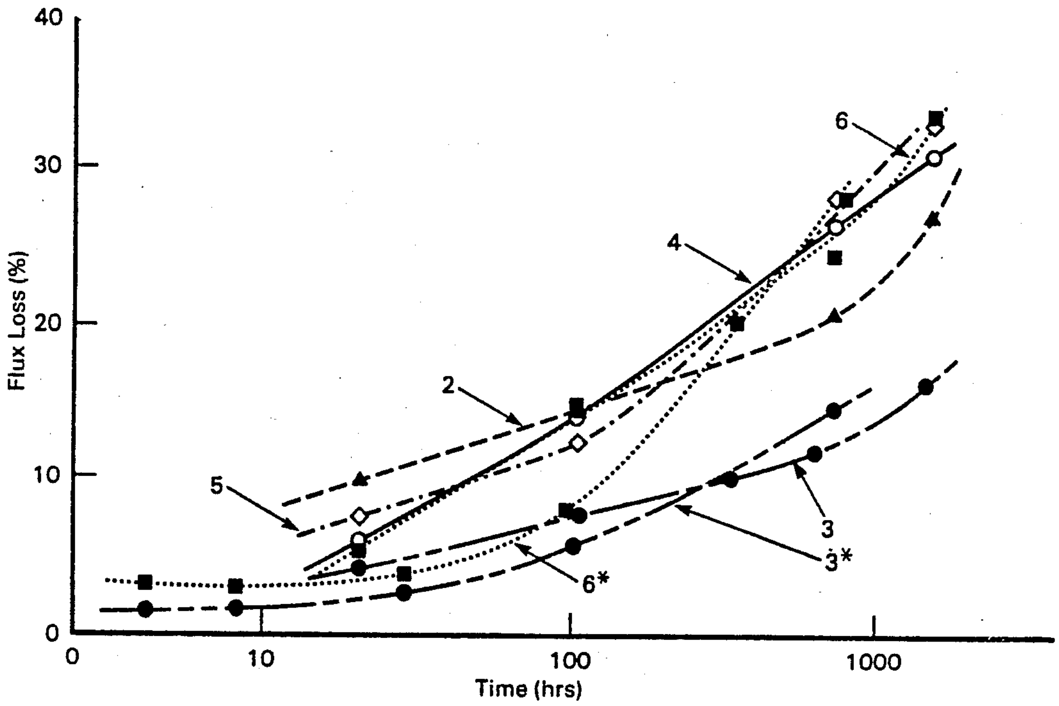
FIG. 1 is a plot of flux loss measured at room temperature versus aging time in air at 150° C. for several different dry epoxy powder formulations.

Referring to Table I, all materials were obtained from commercial sources and used as received with the exception of the imidazole catalysts. These were redistilled to yield essentially pure EMI and HPMI. The catalysts were handled carefully to reduce exposure to air or atmospheric moisture.

TABLE I

| Constituents of Epoxy Compositions | | | |
|---|---|---|---|
| Tradename | Vendor | Composition | Remarks |
| EPON 1031 | Shell | tetraglycidyl ether of tetraphenol ethane | Solid epoxy resin |
| DER 330 | Dow | DGEBA* | Liquid epoxy resin |
| EPIREZ SU-8 | Celanese | DGEBA* | Liquid epoxy resin |
| EPIREZ SU-5 | Celanese | DGEBA* | Liquid epoxy resin |
| EMI | | 2-ethyl-4-methyl imidazole | Latent catalyst |
| AP-5 | Archem | 1-(2-hydroxy propyl) imidazole | Latent catalyst |
| EPOTUF 37-058 | Reichold | | Low viscosity epoxy diluent |

*Diglycidyl ether of bisphenol A.

The liquid epoxy (GMR 03300) for vacuum impregnation was made in a high speed laboratory mixer equipped with a Cowls blade. The catalyst was added in appropriate amounts and mixed by hand just prior to impregnation. Unless otherwise noted in the examples the dry epoxy powders for blending with the RE-Fe-B melt-spun ribbons were compounded as follows. The solid epoxy was dispersed in a Waring blender operating at high speed. The liquid catalyst was added to the epoxy while blending. The resultant dry mixture was then jet milled to obtain free flowing particles about 1 to 10 microns in diameter. The powder as formed thus consisted of the uncured epoxy and latent catalyst. Heating such powders results in melting of the uncured resin at about 65° C. followed by activation of the latent curing agent to effect a rapid cure of the epoxy. The fact that the epoxy powder melts and flows around the magnetic alloy particles before it cures is believed to account, at least in part, for the excellent oxidation resistance provided by the dry epoxy bonding agent. Electron micrographs confirm this hypothesis for they show that the epoxy resin fills the interstices between the alloy particles.

Melt-spun ribbons of nominal composition $Nd_{0.125}Fe_{0.809}B_{0.056}$ having an average magnetic remanence ($B_r$) of about 7.5 kiloGauss and an intrinsic magnetic coercivity ($H_{ci}$) of about 16 kiloOersted as quenched were ball milled in air and screened to a sieve fraction between 45 micronmeters (325 mesh) and 250 micronmeters (60 mesh). Such small particle size is not necessary but it makes automatic die loading by volume portion easier.

For vacuum impregnation with hardenable liquid resin, the alloy powder was placed in a rubber tube with an internal diameter of 8 mm. Rubber plugs sized to be slidable within the tube were inserted in either end. This assembly was inserted in a hydraulic press and the powder was isostatically compacted to a density of about 85% of the alloy density at a compaction pressure of about 160 kpsi. The resultant compact was placed in a side arm pyrex test tube. The tube was evacuated with a mechanical vacuum pump. A hypodermic needle attached to the syringe carrying liquid epoxy resin was then inserted through the rubber stopper of the tube. The resin was dropped into the tube to saturate the compact. The saturated compact was removed and cured in air at 120° C. for one hour.

For the dry process, about 2.5 weight parts epoxy resin and catalyst powder were added to 100 weight parts alloy powder. The resin and alloy powders were then thoroughly mixed by ultrasonic vibration. The powder mixture was then pressed either isostatically in a rubber sleeve as described above or uniaxially in a steel die in a hydraulic press at a pressure of 160 kpsi. The compacts were cured in air at 150° C. for thirty to sixty minutes.

The density of the alloy ribbon is about 7.53 grams per cubic centimeter (g/cc). The density of epoxy-fee isostatically samples compacted at 16 kpsi was about 6.4 g/cc; the isostatically pressed dry epoxy and alloy powders about 6.4 g/cc; and the uniaxially pressed dry mixed powders about 6.1 g/cc.

After cure, the bonded samples were magnetized in a 40 kiloOersted pulsed magnetic field, that being the strongest available for this work but not strong enough to magnetically saturate the alloy. Magnetic measurements were made on a vibrating sample magnetometer, Princeton Applied Research (PAR) Model 155, at a room temperature of about 25° C.

To facilitate magnetic measurement, small spheres (about 80 milligrams each) were sanded from irregular pieces of magnet samples in an air driven sandpaper raceway. The spheres were put in plastic sample holders which could be used with the magnetometer. Small holes were drilled in the sample holders to ensure easy access of air to the samples during aging. I believe that this preparation method is valid to determine the relative oxidation resistance of several different binder compositions. However, the sanding step probably causes microcracking of the resin binder. Such crtacked samples would age faster than otherwise like samples in which the resin is not subjected to stress. Microcracking creates pathways for oxidation to the alloy particles and early magnetic degradation.

EXAMPLE 1

The initial selection of epoxy resins for dry-bonding RE-Fe-B melt spun ribbon particles was based in part on the need for a binder with a high glass transition temperature ($T_g$ greater than about 150° C.). Such $T_g$'s assure that a magnet will not become soft or permeable to oxidants at elevated temperatures. For example, field magnets for automotive d.c. motors could experience temperatures up to 125° C. in the underhood environment during hot summer months. The epoxy bonding agent must have a higher Tg than the expected use temperature to prevent excessive loss of magnetic properties over time.

Accordingly, a series of five formulations was made up as set out in Table II. The Tg's of EPON and EPIREZ resins were measured to be above 200° C.

TABLE II

| | Epoxy Chemistry | | |
|---|---|---|---|
| Epoxy No. | Resin (R) | Catalyst (C) | C/R Ratio |
| 1 | GMR 0330[a] | EMI[b] | 0.05 |
| 2 | Shell EPON 1031 | EMI[b] | 0.04 |
| 3 | Shell EPON 1031 | AP-5[c] | 0.076 |
| 4 | Celanese EPIREZ SU-8 | AP-5[c] | 0.04 |
| 5 | Celanese EPIREZ SU-5 | AP-5[c] | 0.05 |
| 6 | Half SU-8, Half SU-5 | AP-5[c] | 0.10 |

[a] = liquid epoxy for vacuum impregnation
[b] = 2-ethyl-4-methyl imidazole
[c] = 1-(2-hydroxypropyl)-2-methyl imidazole.

Bonded magnet samples were made by liquid impregnation and dry blending as set forth above and were magnetized in a 40 kOe pulsed field. Flux measurements were made for each sample in the PAR magnetometer. The flux loss of the samples was calculated by taking periodic magnetic measurements as the samples were aged in air at 150° C. in the sample containers.

FIG. 1 shows Flux Loss as a percentage of the original measured flux as a function of aging time in hours. The number labels for the curves correspond to the "Epoxy No."'s of Table II. The "*" designations represent duplicate runs for the same epoxy composition number. Total losses ranged from about 15 to 20% after aging several hundred hours at 150° C. Epoxy No. 3 which is a tetraglycidyl ether of tetraphenol ethane catalyzed with about 7.6 weight percent 1-(2-hydroxypropyl)-2-methyl imidazole showed that the lowest overall flux loss.

EXAMPLE 2

Tests were conducted to determine whether the atmosphere in which the dry blended epoxy powder samples were cured, i.e. whether the atmosphere in which the catalyst was first activated at a temperature of about 150° C., made any significant difference in the aging characteristics of the magnets.

Magnet samples of dry Epoxy No. 2 from Table II and Nd-Fe-B powder were made as in Example 1 except that the epoxy cure after compaction was separately conducted in a vacuum, argon, pure oxygen and in air. The samples were put in quartz ampules which were then evacuated to 10-5 mm Hg. Argon, oxygen and air were backfilled into the ampules depending on the desired cure atmosphere and the ampules were sealed. The sealed ampules containing the samples were then heated for one hour at 150° C.

Referring to Table III, after the cured samples were removed from the ampules, they were magnetized in a 40 kiloGauss pulsed field and then exposed to a reverse field of 9 kOe at room temperature. This application of a reverse field (a process also known as preconditioning) is often used to simulate the demagnetizing conditions a magnet may encounter during actual use. For example, a motor field magnet sees a momentary reverse field when the armature is engaged.

Table III sets out the measured room temperature flux loss at a remanence to coercivity slope (B/H) of negative one (−1) after aging the samples for 15 and 158 hours at 150° C. The data supports the hypothesis that there is no significant difference in aging flux loss attributable to the cure atmosphere.

TABLE III

| Flux Loss as a Function of Cure Atmosphere | | | |
|---|---|---|---|
| | Flux Loss (%) for B/H = −1 | | |
| Cure Atmosphere | Preconditioned* | Aged 15 hrs, 150° C. | Aged 158 hrs, 150° C. |
| Vacuum | 9.5 | 8.5 | 14.0 |
| Argon | 9.5 | 9.5 | 14.3 |
| Oxygen | 8.0 | 8.0 | 12.9 |
| Air | 8.0 | 6.1 | 14.1 |

*Room temperature recoil from −9 kOe which is experimentally equivalent to −5 kOe at 150° C.

EXAMPLE 3

Tests were run to compare the relative flux losses of epoxy-free magnet compacts, compacts impregnated with liquid Epoxy No. 1, Table II, and compacts bonded with dry Epoxy No. 2, Table II. The samples were magnetized in a 40 kiloGauss pulsed field and then exposed to a reverse field of 9 kOe at room temperature. They were then aged in air at 160° C. in a reverse magnetic field of 4 kOe for a total of 1426 hours. This aging schedule is an accelerated method for determining the magnetic durability of magnets which will be exposed to elevated temperatures and reverse magnetic fields in use.

Figure 2:
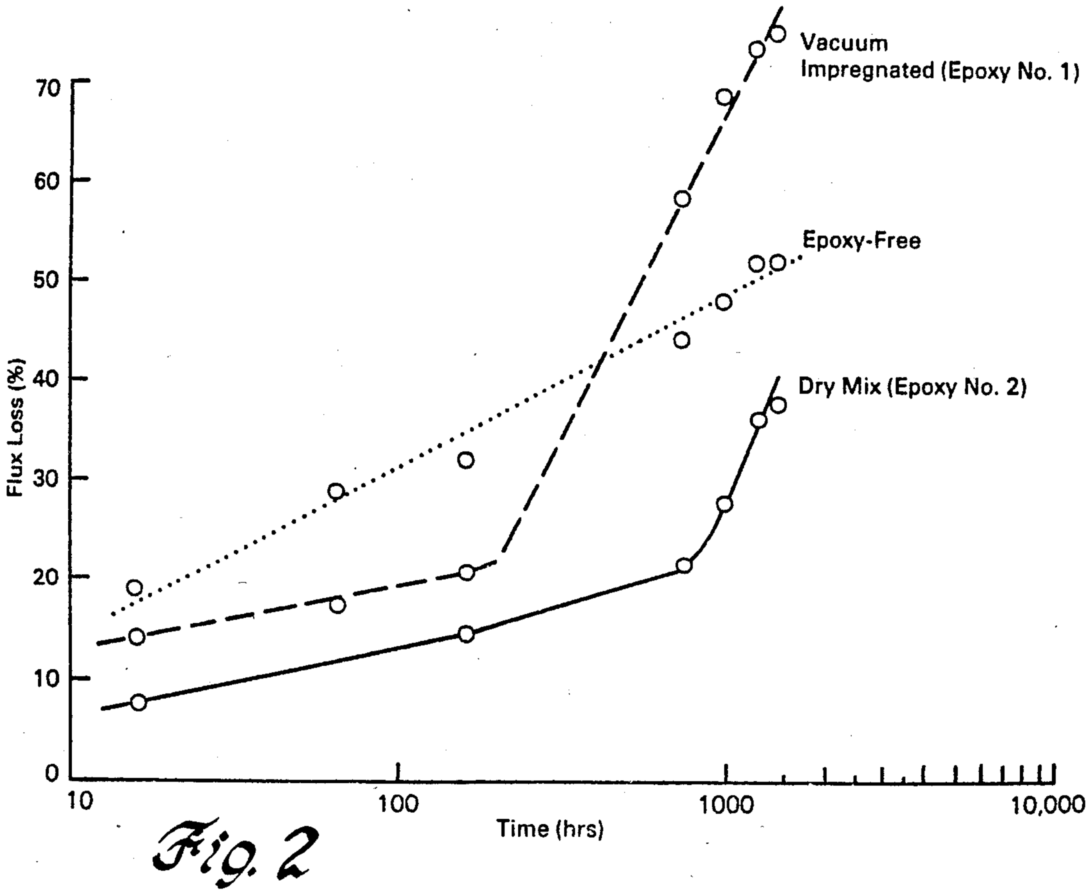
FIG. 2 is a plot of room temperature flux loss versus aging time in air at 160° C. in a reverse magnetic field of 4,000 Oersteds at room temperature for magnetized magnets formed by impregnating melt-spun Nd-Fe-B ribbon with liquid epoxy, by mixing melt-spun ribbon with the subject dry epoxy powder and by pressing melt-spun ribbon without a binder.

FIG. 2 shows the Flux Loss as percentage of the original flux density as a function of aging time. Clearly, the dry mix epoxy bonded magnets exhibit the least flux loss throughout the entire aging schedule.

Figure 3:
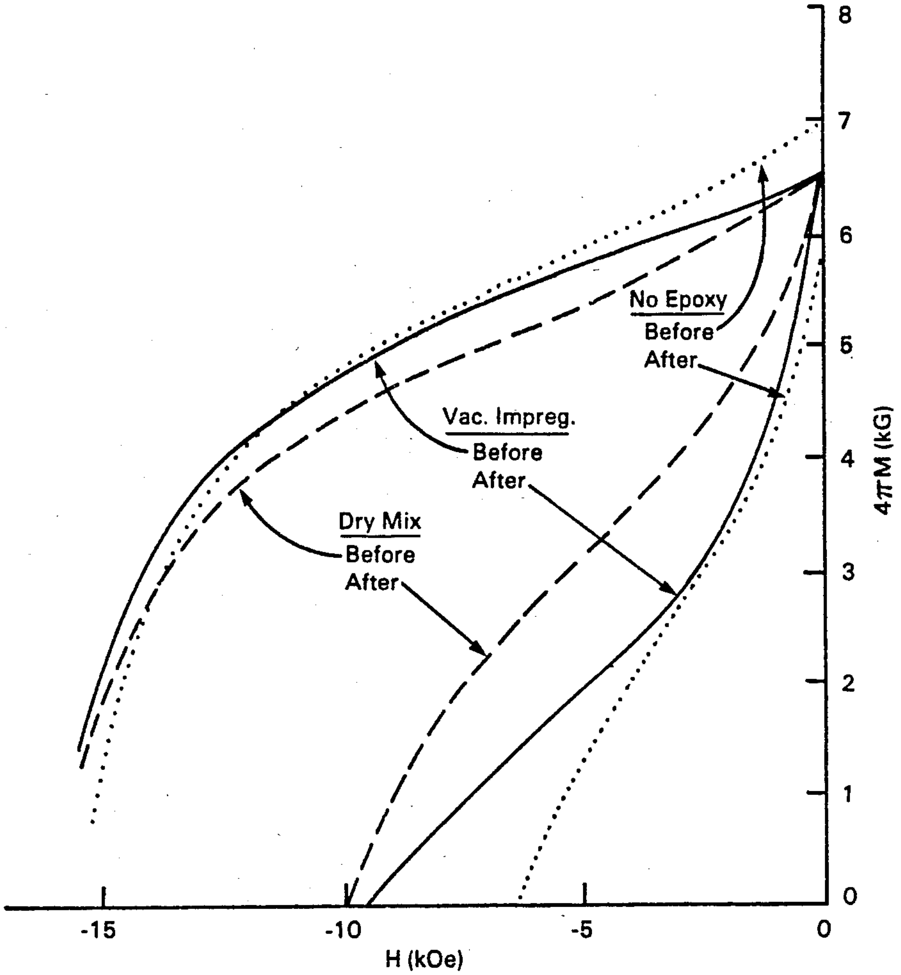
FIG. 3 is a plot of second quadrant demagnetization for magnetized magnets formed by impregnating melt-spun Nd-Fe-B ribbon with liquid epoxy, by mixing melt-spun ribbon with the subject dry epoxy powder and by pressing melt-spun ribbon without a binder after aging in a reverse field of 4,000 Oersteds at 160° C. for 1426 hours.

FIG. 3 is a second quadrant demagnetization plot for these samples after a total aging time of 1426 hours at 160° C. in air.

EXAMPLE 4

A technique for qualitative determination of the adhesion in a compacted sample was developed. Dry epoxy was mixed in a 15 volume percent ratio with aluminum powder, glass microspheres and rare earth-iron-boron alloy as set out in Table IV. The amount of each powder was calculated to result in equally sized compacts. The samples were placed in a circular die having a diameter of one inch and were compacted with a punch at 50,000 pounds pressure to make a wafer shaped sample. The samples were cured for 30 minutes in air at 150° C.

The liquid epoxy bonded samples were made by pressing the powders in the same die at 50,000 pounds pressure. The glass microspheres did not form a compact except when pressed with dry epoxy. The aluminum and alloy compacts were impregnated with GMR 03300 resin and cured at 150° C. for one hour.

The strength of these compacts was measured by an axial flex method. Each disk sample was centered on the end of a hollow support tube. A rigidly caged one inch diameter steel ball was lowered onto the center of the sample. An Instron test machine was used to apply load on the sample with the ball and to record the magnitude of the applied pressure. The measurement reported in Table IV is the loading at break reported in Newtons. The dry epoxy clearly provided the highest strength compacts as well as the most oxidation resistance. Compacts bonded with EMI catalyzed powder were slightly stronger than HPMI cured compacts but slightly less resistant to aging.

TABLE IV

| Axial Flex Test (Load at Break, N) | | | |
|---|---|---|---|
| | Aluminum Powder (1 gram) | Glass Microspheres (0.7 grams) | Nd—Fe—B Magnequench Ribbon (6 grams) |
| No adhesive | 43 | — | 20 |
| Liquid Epoxy - No. 1, Table II | 100 | — | 163 |
| Epoxy Powder - No. 2, Table II | 122 | 100 | 180 |

Table V lists epoxy systems which have been tested as possible candidates for making bonded rare earth-iron based particle magnets. The samples were formed by impregnation or powder compaction as described above, magnetized in a 40 kOe pulsed field (no reverse field was applied) and then subjected to high temperature aging in air. The products and test compositions are listed in ascending order with respect to flux loss after aging at temperatures of at least 150° C. for at least 100 hours. The sample bonded with the dry epoxy of this invention had the smallest loss in magnetism (about 7.7% for 100 hours at 150° C.) while the vacuum impregnated EPON 828 ethyl methyl imidazole hardened samples exhibited the highest flux loss (about 50.7% for 336 hours at 200° C.).

TABLE V

| Experimental Organic Bonding Systems for Rare Earth-Iron Alloy Particles (Flux Loss After 336 Hours at 220° C. in Air) | | | | |
|---|---|---|---|---|
| Test Mtrl. Rank | Type | Trade Designations | Process** | Percent Flux Loss |
| 1* | Epoxy | EPON 1033, AP-5 | DBP | 7.7 |
| 2* | Epoxy | DER 330 | LVI | 8.2 |
| 3 | Epoxy | DER 330 | LVI | 12.1 |
| 4 | Polyester | IMPCO POLYESTER | LVI | 21.4 |
| 5 | Epoxy | STERLING 83V-198 | LMBPC | 21.7 |
| 6 | Polyester | P.D. GEORGE 433-75 | LMBPC | 24.2 |
| 7 | Epoxy | EPON 828, NMA HARDENER, DB VIII ACCELERATOR | LVI | 24.5 |
| 8 | Epoxy | PRATT & LAMBERT 88-936 | DBP | 24.5 |
| 9 | Epoxy | HYSOL DK 12-0701 | DBP | 27.3 |
| 10 | | LOCTITE 290 | LVI | 27.4 |
| 11 | Epoxy | STERLING 663 | LMBPC | 27.7 |
| 12 | Epoxy | PRATT & LAMBERT 88-1005 | DBP | 32.0 |
| 13 | Epoxy | PRATT & LAMBERT 81-1926 | DBP | 36.5 |
| 14 | Epoxy | PRATT & LAMBERT 87-1211 | DBP | 37.7 |
| 15 | Epoxy | EPON 828, EMI HARDENER | LVI | 50.7 |

*100 hours at 150° C. in air
**DBP = dry blend powder
LVI = liquid vacuum impregnation
LMBPC = liquid mix, B-stage on alloy powder, press, cure Under all life test conditions encountered to date, rare earth-iron-boron particle magnets bonded with the dry epoxy powders described herein exhibit the highest bond strengths and are the most resistant to aging. A further advantage of this invention is that this novel dry powder epoxy binder is much easier to work with than a sticky, hardenable, liquid binder. Another advantage is that the epoxy powder need only be incorporated in an amount of a few weight percent or about 15 volume percent before compaction. This provides the advantages of higher packing densities and less dilution of the magnetic strength of the constituent magnetic alloy.

While the preferred embodiment describes bonding crushed, magnetically isotropic ribbons of melt-spun RE-Fe-B alloy, the subject epoxy would be equally suited for bonding magnetically anisotropic forms of like alloys.

While my invention has been described in terms of specific embodiments thereof, other forms could be readily adapted by others skilled in the art. Accordingly, the scope of the invention is to be limited only by the following claims.

The embodiments of the invention in which an exclusive property or privilege is claimed are defined as follows:

1. A compact for making a bonded rare earth-transition metal permanent magnet, said compact comprising particles of magnetizable rare earth-transition metal alloy blended with a dry epoxy powder comprised of a polyglycidyl ether of a polyphenol alkane having a glass transition temperature greater than about 150° and a latent imidazole catalyst for said epoxy which is substituted in the two position with an alkyl group, which dry epoxy powder melts at an elevated temperature to flow around the alloy particles and thereby protect them from oxidation and at which temperature the imidazole catalyst is first activated to cure the epoxy resin and bind the alloy particles together into a durable magnet body which is resistant to flux loss at temperatures below the glass transition temperature of the cured epoxy.

2. A compact for making a bonded rare earth-transition metal permanent magnet, said compact comprising particles of magnetizable rare earth element-iron-boron alloy where the rare earth element is neodymium and/or praseodymium thoroughly mixed with a dry epoxy powder consisting essentially of an epoxy resin having the idealized structure

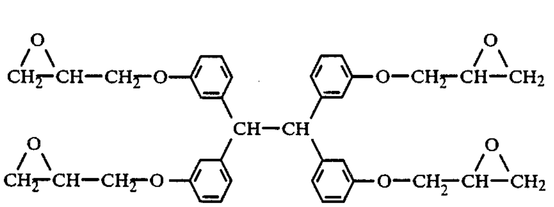

and one or more latent imidazole catalysts for said resin taken from the group consisting of 2-ethyl-4-methyl imidazole and 1-(2-hydroxypropyl)-2-methyl imidazole, said compact having a density of at least about seventy percent of the alloy density and which compact can be heated to a temperature above about 100° C. to melt the epoxy powder so that it fills the spaces between the alloy particles and first activates the catalyst to cure the epoxy and form a magnet body that is durable and resistant to flux loss at temperatures below the glass transition temperature of the cured epoxy.

3. A method of making a bonded permanent magnet comprising the steps of mixing particles of rapidly quenched rare earth-iron-boron alloy with about 2–5 weight percent of a dry, free-flowing powder consisting essentially of an uncured epoxy resin which is a polyglycidyl ether of a polyphenol alkane having a glass transition temperature of at least about 150° C. and an imidazole catalyst for said resin which is inactive at the mixing temperature to cure the resin; pressing the mixture into a compact having a density of at least about 70 percent of the alloy density; heating said compact for a time and to a temperature at which the epoxy powder melts to coat and fill the voids between the alloy particles and the catalyst is activated to fully cure the epoxy resin; and magnetizing the compacted alloy particles in an applied magnetic field, said method providing a magnet that is durable and resistant to flux loss at temperatures below the glass transition temperature of the epoxy.

4. The compact of claim 1 where the dry epoxy powder particles average less than about 15 microns in diameter.

5. The compact of claim 1 where the alloy particles consist essentially of crushed, melt-spun ribbon of neodymium and/or praseodymium-iron-boron alloy.

6. The compact of claim 1 where the resin constituent of the dry epoxy powder has the idealized structure

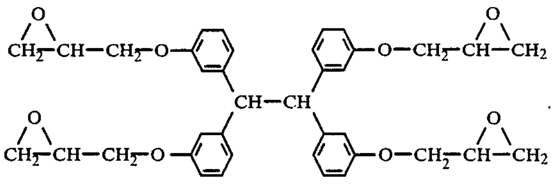

7. The compact of claim 1 where the resin constituent of the dry epoxy powder is a tetraglycidyl ether of tetraphenol ethane and the catalyst is 1-(2-hydroxy propyl)-2-methyl imidazole and/or 2-ethyl-4-methyl imidazole.

8. The compact of claim 1 where the epoxy powder is present in an amount of about 2–5 weight percent based on the weight of the alloy particles.

9. A mechanically strong, flux loss resistant permanent magnet which is formed by mixing particles of rapidly quenched rare earth-iron-boron alloy with about 2–5 weight percent of a dry, free-flowing powder consisting essentially of an uncured epoxy resin which is a polyglycidyl ether of a polyphenol alkane having a glass transition temperature of at least about 150° C. and an imidazole catalyst for said resin which is inactive at the mixing temperature to cure the resin; pressing the mixture into a compact having a density of at least about 70 percent of the alloy density; heating the compact for a time and to a temperature at which the epoxy powder melts to fill the voids between the alloy particles and the catalyst is activated to fully cure the epoxy resin; and magnetizing the compacted alloy particles in an applied magnetic field.

10. The permanent magnet of claim 9 where the resin constituent of the dry epoxy powder is a tetraglycidyl ether of tetraphenol ethane and the catalyst is 1-(2-hydroxy propyl)-2-methyl imidazole and/or 2-ethyl-4-methyl imidazole.

11. The permanent magnet of claim 9 where the epoxy resin is present in an amount of about 2–5 weight percent based on the weight of the alloy particles.

12. The permanent magnet of claim 9 where the resin constituent of the dry epoxy powder is a tetraglycidyl ether of tetraphenol ethane and the catalyst is 1-(2-hydroxy propyl)-2-methyl imidazole and/or 2-ethyl-4-methyl imidazole and wherein the epoxy powder is present in an amount of about 2–5 weight percent based on the weight of the alloy particles.

13. A strong, flux loss resistant permanent magnet which is formed by mixing particles of rare earth-iron-boron alloy with about 2–5 weight percent of a dry, free-flowing powder consisting essentially of an uncured epoxy resin which is a polyglycidyl ether of a polyphenol alkane having a glass transition temperature of at least about 150° C. and an imidazole catalyst for said resin which is inactive at the mixing temperature to cure the resin; pressing the mixture into a compact having a density of at least about 70 percent of the alloy density; heating the compact for a time and to a temperature at which the epoxy powder melts to fill the voids between the alloy particles and the catalyst is activated to fully cure the epoxy resin; and magnetizing the compacted alloy particles in an applied magnetic field.

14. A rare earth-iron alloy permanent magnet in which particles of the alloy are bonded together with about 2 to 5 weight percent based on the alloy weight of an epoxy resin which is a tetraglycidyl ether of tetraphenol ethane having a glass transition temperature greater than about 150° C. which resin contains about 2 to 10 weight percent based on the resin of an imidazole catalyst therefor which is substituted in the two position with an alkyl group, the density of said magnet being at least about 70 percent of the alloy density.

* * * * *